June 28, 1927.

G. PIERCE

VEHICLE HEADLIGHT

Original Filed Oct. 31, 1924

INVENTOR
G. Pierce
by E. J. Featherstonhaugh
ATTORNEY

June 28, 1927.
G. PIERCE
1,634,043
VEHICLE HEADLIGHT
Original Filed Oct. 31, 1924    2 Sheets-Sheet 2
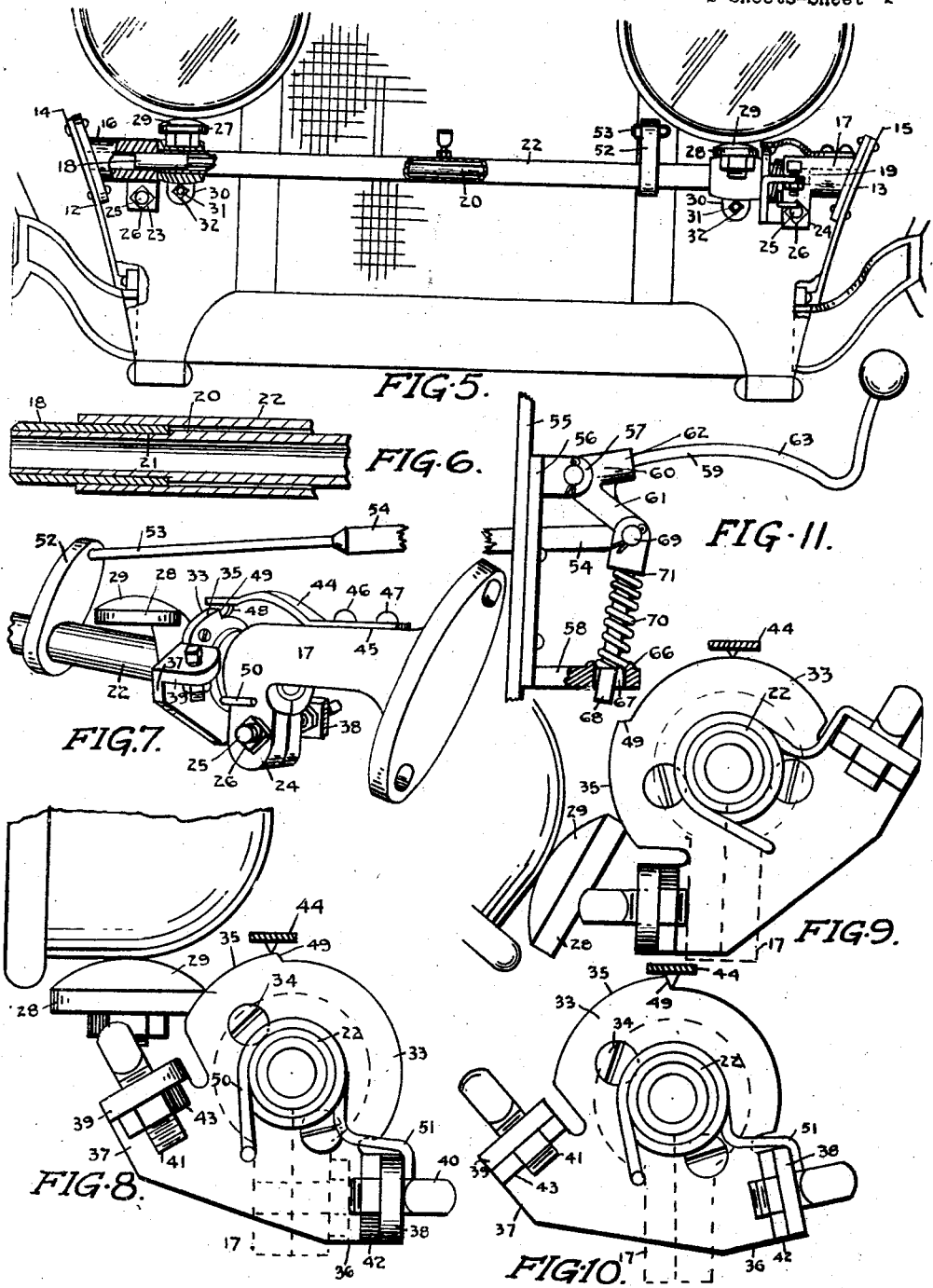
INVENTOR
G. Pierce
by E.J. Fetherstonhaugh
ATTORNEY Patented June 28, 1927.

1,634,043

UNITED STATES PATENT OFFICE.

GEORGE PIERCE, OF MONTREAL, QUEBEC, CANADA.

VEHICLE HEADLIGHT.

Application filed October 31, 1924, Serial No. 747,067. Renewed February 5, 1927.

The invention relates to a vehicle headlight, as described in the present specification and illustrated in the accompanying drawings that form part of the same.

The invention consists essentially of the novel features of construction pointed out broadly and specifically in the claims for novelty following a description containing an explanation in detail of an acceptable form of the invention.

The objects of the invention are to avoid the dangers to life and property incident to driving a motor car at night and meeting others; to dispel the glare and thus definitely outline the cars and their position so that the drivers may steer clear of one another as safely as in the full brightness of day time; to eliminate rattling and insecurity so far as the mounting of the lights is concerned and insure rigidity equal to if not superior to the stationary light; to enable the distribution of the light mountings and operating mechanism throughout the country for installation by divers persons without fear of bungling and consequent misplacement of parts; in other words effect a unitary mechanism ready for immediate application to a motor car; and generally to provide a simple, safe and efficient mechanism for the aforesaid purposes.

In the drawings Figure 1 is a side elevation of the front portion of a motor car broken away to disclose the light mounting and operating mechanism.

Figure 5 is a front view of the portion of the car concerned, showing the light mounting partially in section.

Figure 6 is an enlarged fragmentary sectional view, showing the self aligning bearing.

Figure 7 is an enlarged perspective detail of the light mounting and operating mechanism.

Figure 8 is an enlarged end view of the light mounting showing it in the upright position.

Figure 9 is an enlarged end view of the light mounting, showing it in the fully dipped position.

Figure 10 is an enlarged end view of the light mounting showing it in the slightly dipped position.

Figure 11 is an enlarged view showing the operating means including the handle and toggle-joint mechanism.

Like numerals of reference indicate corresponding parts in the various figures.

Figure 1:
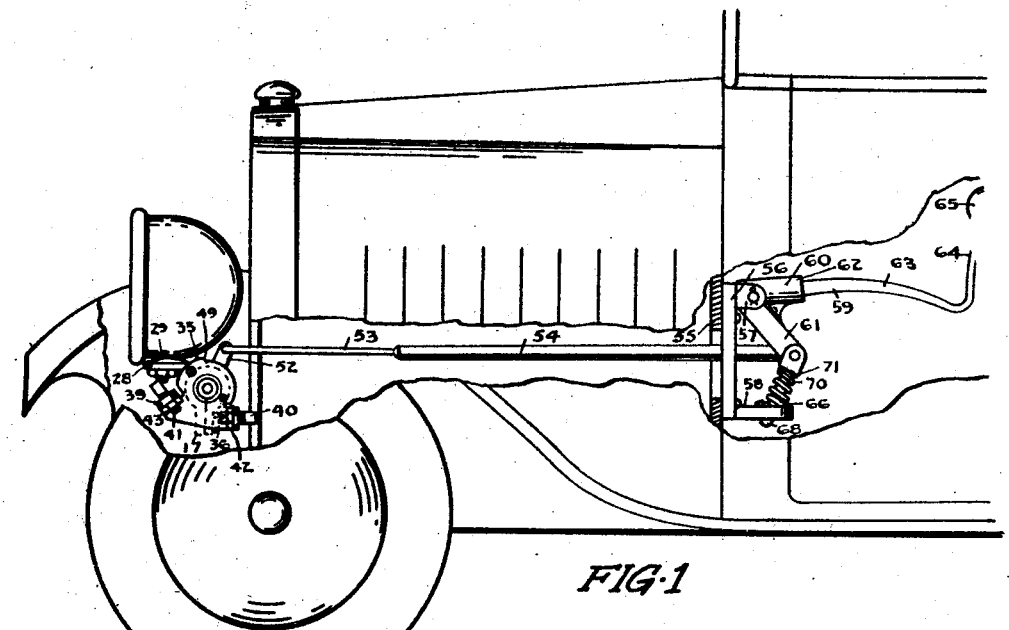
Figure 2:
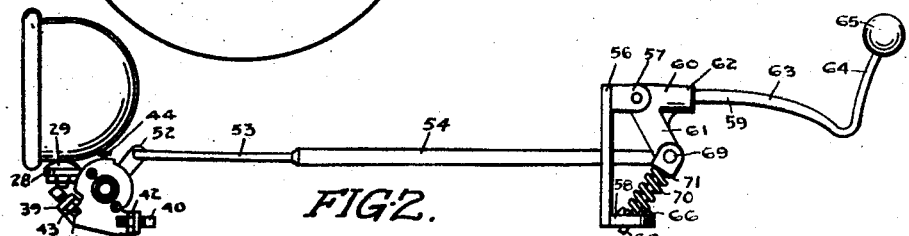
Figure 2 is a diagrammatic view showing the upright and glare position of the light and the operating mechanism.
Figure 3:
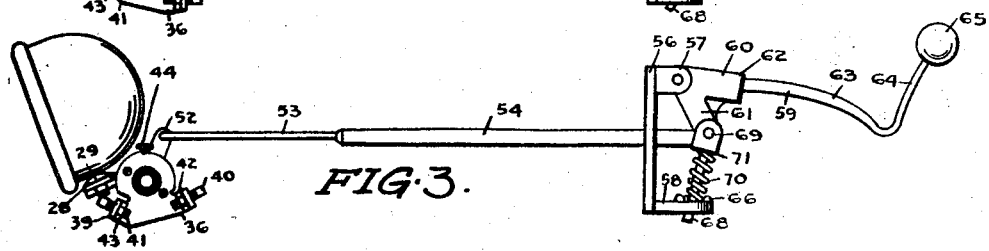
Figure 3 is a diagrammatic view showing the slightly dipped position to relieve the glare for safety in driving.
Figure 4:
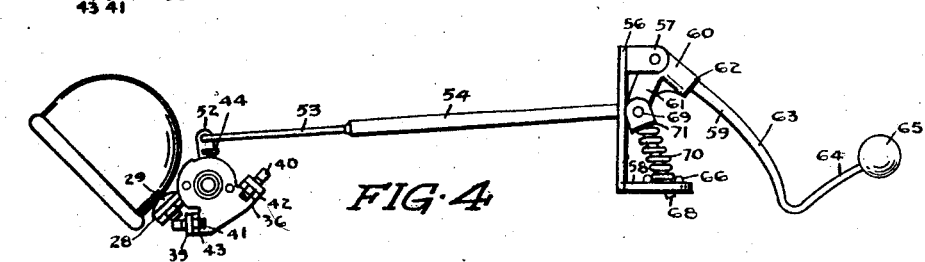
Figure 4 is a diagrammatic view showing the fully dipped position for driving in urban centers.

Referring to the drawings, the brackets 12 and 13 extend upwardly from the vehicle frame inside of the fenders or front mudguards 14 and 15 as customary in present day practice.

The sockets 16 and 17 are rigidly secured through the mudguards 14 and 15 to the brackets 12 and 13 and project inwardly and form supports for the bushings 18 and 19, which project outwardly therefrom.

The inner aligning tube 20 is slightly reduced at the ends 21 and is inserted in the bushings 18 and 19 and this tube maintains the alignment of bushings in their bearings from side to side of the vehicle and in outside measurement is a little smaller than said bushings.

The outer tube 22 is mounted on the projecting ends of the bushings 18 and 19 and extends across the vehicle front and encircles the inner tube 20 being spaced therefrom by the increased size of the said bushings.

The sockets 16 and 17 are formed at their outer ends with the clamping lugs 23 and 24 respectively, which are fastened by the bolts 25 and nuts 26 to rigidly hold the bushings 18 and 19 in said sockets.

The light mountings 27 and 28 are formed with the customary mushroom overhangs 29 and secured on the outer tube 22 adjacent to the ends of said tube by the clamp extensions 30 through which the bolts 31 are inserted and fastened by the nuts 32.

The stop plate 33 is secured to the light mounting 28 by the screws 34 and is formed in part circular shape having the arc-shaped abutment surface 35 and the extensions 36 and 37 and the lugs 38 and 39 projecting laterally from said extensions respectively and carrying the adjusting set screw stops 40 and 41 locked by the nuts 42 and 43 respectively.

The flat spring 44 is secured in a groove 45 in the socket 17 by the cap screws 46 and 47 and extends beyond said socket to the stop plate 33 having the bevelled tip 48 adapted to engage the abutment surface 35 on the top thereof against the pressure of the spring in the upright position of the light and to rub against the shoulder 49 or rise of said surface in the slightly dipped position of the light.

The spring 50 encircles the tube 22 next to the stop plate 33 and at one end is caught to the socket 17 and at the other end 51 engages the lug 38 from the plate 33 and acts as a cushion in the operation of the lights and is not intended to return the lights to their upright position, but merely serve as a deterrent to undue violence in lowering the lights.

The crank 52 is clamped on to the tube 22 adjacent to the lamp mounting 28 and is pivotally joined to the connecting rod 53 which extends into and is secured to the enlarged operating rod 54.

The rod 54 extends through the dash 55 and bracket 56, the latter having the outstanding upper lugs 57 and lower flange 58 and means for securing it to the said dash 55.

The crank lever 59 is pivotally secured between the lugs 57 and its sections 60 and 61 are formed at an acute angle, the section 60 having a screw socket 62 in which the handle 63 is screwed said handle having the upturned end 64 and knob 65.

The flange 58 is formed with a boss 66 and pin hole 67 centrally through said boss for the pin 68, the upper end of which is forked and pivotally secured to the section 61 and to this pivotal joint 69 the operating rod 54 is secured.

The helical spring 70 encircles the pin 68 between the rounded boss 66 and shoulder 71 of the forked end of the said pin and is continuously in a state of compression.

In the operation of this invention the usual travelling position of the lights in a dark roadway is upright, so that the lights will throw a strong light ahead and enable the driver to see clearly any inequalities in the road ahead and guide the vehicle accordingly, but when another vehicle approaches his from the opposite direction of travel, the glare of the headlights will make his own vehicle invisible to the other driver, consequently in approaching he moves his light lever to throw the lights slightly off the vertical in a downward direction, thus the light rays while still on the roadway, are directed at a downward incline instantly relieving the glare and perfectly outlining the car to the approaching driver, and thereby eliminating all dangers in passing.

In the event of the motorist reaching a city or large town, he dips his lights so that only a narrow crescent of light shows from ahead, while his wheels and front of his car are brightly illuminated, thus proving an advantage in city travelling without any glare and strictly conforming to the regulations affecting city travel.

What I claim is:—

1. In vehicle headlights, a tubular mounting having the lamps clamped thereto, a bearing member for said tubular mounting including an aligning tube reduced at the ends and inserted into short tubes of greater outside dimensions than the aligning tube and spacing the inner wall of the mounting from the latter and extending from brackets adapted to be secured to the vehicle and lever mechanism for operating said mounting.

2. In vehicle headlights, a lamp support rotatably mounted, bearings for said support, bearing brackets having sockets clamped on said bearings, lamp brackets clamped on said support, a return coil spring engaging said support, and a stop member secured to one of said lamp brackets and having a retarding surface suitably engaged and extensions with adjustable stop members secured therein and adapted to engage projections from the bearing bracket.

3. In vehicle headlights, a lamp support rotatably mounted, bearings for said support, bearing brackets having sockets clamped on said bearings, lamp brackets clamped on said support, a return coil spring engaging said support, and a stop member in plate form secured to one of said lamp brackets and having an arc-shaped retarding surface formed with an abutment engaged by a spring retarding member from the bearing bracket, said plate having extensions and adjustable stops in said extensions adapted to engage a clamp.

4. In vehicle headlights, a pair of sockets rigidly secured through other members to the vehicle frame one having a longitudinal spring finger recess, a spring finger screwed to said bracket in said recess and having a bevelled under side to its tip adapted to engage a stop plate, a pair of bushings held in said sockets, an aligning shaft extending across the vehicle front and inserted through said bushings, a tubular member mounted on said bushings and spaced thereby from said aligning shaft, a pair of light mountings clamped on said tubular member, a stop plate secured to one of said mountings, a cushion spring encircling said tubular member and engaging a socket member and said stop plate, and means for operating said tubular member to dip the lights and hold under pressure in their upright and dipped positions.

5. In vehicle headlights, a pair of sockets rigidly supported from the vehicle frame, a pair of bushings held in said sockets, a tube reduced at the ends and inserted in said bushings and aligning the same and projecting outwardly and forming bearings beyond the sockets, a tubular member mounted on said bushings, and spaced thereby from said aligning shaft, a pair of light mountings clamped on said tubular members, a stop plate secured to one of said mountings, a cushion spring encircling said tubular member and engaging a socket member and said stop plate, and means for operating said tubular member to dip the lights and hold under pressure in their upright and dipped positions.

6. In vehicle headlights, a pair of sockets rigidly supported from the vehicle frame, a pair of bushings held in said sockets, an aligning shaft extending across the vehicle front and inserted through said bushings, a tubular member journalled in said bushings, and having a crank member secured thereto, a pair of light mountings, clamped on said tubular member, a stop plate secured to one of said mountings, a cushion spring encircling said tubular member and engaging a socket member and said stop plate, and means for operating said tubular member to dip the lights and hold under pressure in their upright and dipped positions.

7. In vehicle headlights, a pair of sockets rigidly supported from the vehicle frame, a pair of bushings held in said sockets, an aligning shaft extending across the vehicle front and inserted through said bushings, a tubular member mounted on said bushings and spaced thereby from said aligning shaft, a pair of light mountings clamped on said tubular member, a stop plate secured to the end of a mounting and encircling said tubular member and having an arc-shaped abutment concentric with the tubular member, a spring finger having a tip adapted to spring on to said abutment in the upright position of the lights and engage a shoulder forming the rise in the second position and means for operating said tubular member to dip the lights and hold under pressure in their upright and dipped positions.

8. In a vehicle headlight, a pair of sockets rigidly supported from the vehicle frame, a pair of bushings held in said sockets, an aligning shaft extending across the vehicle front and inserted through said bushings, a tubular member mounted on said bushings and spaced thereby from said aligning shaft, a pair of light mountings clamped on said tubular member, a stop plate secured to one of said mountings, a cushion spring encircling said tubular member and engaging a socket member and said stop plate, a crank engaging said tubular member, an operating rod connected with said crank, a crank lever pivotally mounted and pivotally joined to said operating rod, a handle secured to said crank lever and a spring anchoring pin from said crank lever to a bracket support.

9. In a vehicle headlight, a pair of sockets rigidly supported from the vehicle frame a pair of bushings held in said sockets an aligning shaft extending across the vehicle front and inserted through said bushings, a tubular member mounted on said bushings and spaced thereby from said aligning shaft, a pair of light mountings clamped on said tubular member, a stop plate secured to one of said mountings, a cushion spring encircling said tubular member and engaging a socket member and said stop plate, a crank clamped to said tubular member, a bracket mounted on the vehicle member having an upper pivot bearing and lower flange, a crank lever pivotally secured in said upper pivot bearing, a pin secured to one section of said crank lever and loosely anchored in said flange, a spring encircling said pin between the pin head and said flange, an operating rod pivotally connecting said crank lever and said crank and a handle secured in said crank lever to the other section thereof.

Signed at Montreal, Canada this 29th day of October, 1924.

GEORGE PIERCE.